United States Patent
Cui et al.

(10) Patent No.: US 10,870,182 B2
(45) Date of Patent: Dec. 22, 2020

(54) PANEL POSITIONING ASSEMBLY, BACKLIGHT MODULE AND DISPLAY DEVICE

(71) Applicants: Beijing BOE Optoelectronics Technology Co., Ltd., Beijing (CN); BOE Technology Group Co., Ltd., Beijing (CN)

(72) Inventors: Dong Cui, Beijing (CN); Qing Ma, Beijing (CN); Rui Han, Beijing (CN); Donglong Lin, Beijing (CN); Zeyuan Tong, Beijing (CN); Wenyang Li, Beijing (CN); Lingyu Sun, Beijing (CN); Zhipeng Zhang, Beijing (CN); Peng Wu, Beijing (CN); Bin Long, Beijing (CN); Fujian Ren, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 115 days.

(21) Appl. No.: 16/098,059

(22) PCT Filed: Jan. 29, 2018

(86) PCT No.: PCT/CN2018/074459
§ 371 (c)(1),
(2) Date: Oct. 31, 2018

(87) PCT Pub. No.: WO2019/007044
PCT Pub. Date: Jan. 10, 2019

(65) Prior Publication Data
US 2020/0180088 A1    Jun. 11, 2020

(30) Foreign Application Priority Data

Jul. 4, 2017    (CN) .......................... 2017 1 0537311

(51) Int. Cl.
G02F 1/13357    (2006.01)
B23Q 1/44    (2006.01)

(52) U.S. Cl.
CPC ......... B23Q 1/44 (2013.01); G02F 1/133608 (2013.01)

(58) Field of Classification Search
None
See application file for complete search history.

(56) References Cited

U.S. PATENT DOCUMENTS

2013/0286319 A1* 10/2013 Kuo .................. G02F 1/133308
349/58
2013/0286321 A1* 10/2013 Kuo .................. G02F 1/133308
349/58

FOREIGN PATENT DOCUMENTS

| CN | 1725075 A | 1/2006 |
| CN | 101737735 A | 6/2010 |

(Continued)

OTHER PUBLICATIONS

English translation of International Search Report and Box V of Written Opinion for International Application No. PCT/CN2018/074459, dated Apr. 28, 2018, 6 pages.

(Continued)

*Primary Examiner* — Vip Patel
(74) *Attorney, Agent, or Firm* — Westman, Champlin & Koehler, P.A.

(57) ABSTRACT

A panel positioning assembly, is provided in embodiments of the disclosure, the panel positioning assembly which is used for a panel comprising: a side frame at least partially provided at a periphery of the panel; and a plurality of (Continued)

positioners detachably provided on the side frame and configured to position the panel; and a backlight module and a display device are provided in embodiments of the disclosure, too.

13 Claims, 4 Drawing Sheets

(56) References Cited

FOREIGN PATENT DOCUMENTS

| | | |
|---|---|---|
| CN | 201992464 U | 9/2011 |
| CN | 102360132 A | 2/2012 |
| CN | 105022512 A | 11/2015 |
| CN | 107145008 A | 9/2017 |
| JP | H05-100215 A | 4/1993 |

OTHER PUBLICATIONS

Second Office Action, including Search Report, for Chinese Patent Application No. 201710537311.5, dated Dec. 3, 2019, 17 pages.

* cited by examiner

PANEL POSITIONING ASSEMBLY, BACKLIGHT MODULE AND DISPLAY DEVICE

CROSS-REFERENCE TO RELATED INVENTION

This application is a Section 371 National Stage Application of International Application No. PCT/CN2018/074459, filed on Jan. 29, 2018, entitled "PANEL POSITIONING ASSEMBLY, BACKLIGHT MODULE AND DISPLAY DEVICE", which has not yet published and claims priority to Chinese Patent Application Invention No. 201710537311.5 filed on Jul. 4, 2017 with China National Intellectual Property Administration, the whole disclosure of both being incorporated herein by reference.

BACKGROUND OF THE DISCLOSURE

Field of the Disclosure

Embodiments of the present disclosure relate to a technical field of a manufacturing technology for a liquid crystal product, and in particular, to a panel positioning assembly, a backlight module and a display device.

Description of the Related Art

Liquid crystal displays become more and more widely used in a technical field of onboard equipment of vehicle, and requirements in dimensions of liquid crystal display products by different clients may vary, e.g., nominal dimensions of liquid crystal display products may cover a range of 1 inch to 30 inch; and in a condition that liquid crystal display products of a same nominal dimension vary in their respective resolutions, sizes of active areas thereof differ from one another, and specific sizes of display panels of these liquid crystal display products in turn differ from one another. In order to ensure that display panels of different specific panel sizes which have different active areas may be used in liquid crystal display products having a same nominal dimension, a relevant solution is to design different backlight modules (abbreviated as BLU). Therefore, it is required to manufacture molds individually, for manufacturing different backlight modules, respectively, involving a large amount of cost in molds.

SUMMARY OF THE DISCLOSURE

The embodiments of the present disclosure have been made to overcome or alleviate at least one aspect of the above mentioned disadvantages and/or shortcomings in the prior art, by providing a panel positioning assembly, a backlight module and a display device.

According to an aspect of the exemplary embodiment of the present disclosure, there is provided a panel positioning assembly which is used for a panel, comprising: a side frame at least partially provided at a periphery of the panel; and a plurality of positioners detachably provided on the side frame and configured to position the panel.

According to an embodiment of the disclosure, the side frame is provided with four sides, on each of which a corresponding one of the plurality of positioners is provided.

According to an embodiment of the disclosure, the plurality of positioners are provided respectively at corners of the side frame which function as junctions of adjacent sides of the side frame abutting against each other, respectively.

According to an embodiment of the disclosure, each of the plurality of positioners is in a form of L shape, and is provided at a junction of two adjacent sides of the side frame corresponding thereto.

According to an embodiment of the disclosure, at least one positioner of the plurality of positioners comprises a first connection block and a second connection block.

According to an embodiment of the disclosure, the first connection block and the second connection block differs from each other in size.

According to an embodiment of the disclosure, the first connection block and the second connection block are provided separately and connected with each other.

According to an embodiment of the disclosure, the first connection block and the second connection block are formed integrally into one piece.

According to an embodiment of the disclosure, a notch which is recessed inwards the side frame is formed at a junction of the first connection block and the second connection block of the at least one positioner of the plurality of positioners, on inside walls of the at least one positioner which interface with each other and both face towards an inner side of the side frame.

According to an embodiment of the disclosure, clamping components for connecting with the plurality of positioners respectively are provided at the corners of the side frame, respectively.

According to an embodiment of the disclosure, at least one corner of the corners of the side frame comprises a first side portion and a second side portion abutting against each other, with a first baffle plate being provided at an outer side of the first side portion, and a second baffle plate being provided at an outer side of the second side portion, the first baffle plate and the second baffle plate functioning as the clamping components respectively.

According to an embodiment of the disclosure, the first baffle plate extends perpendicular to the first side portion, at the outer side of the first side portion; and/or the second baffle plate extends perpendicular to the second side portion, at the outer side of the second side portion.

According to an embodiment of the disclosure, the first baffle plate extends at an angle with respect to the first side portion, at the outer side of the first side portion; and/or the second baffle plate extends at an angle with respect to the second side portion, at the outer side of the second side portion.

According to an embodiment of the disclosure, a top portion of the first baffle plate extends away from the first side portion in a direction perpendicular to the first side portion and bends inwards the side frame to form a first shielding portion, and a top portion of the second baffle plate extends away from the second side portion in a direction perpendicular to the second side portion and bends inwards the side frame to form a second shielding portion.

According to an embodiment of the disclosure, a first groove configured to accommodate the first baffle plate and a second groove configured to accommodate the second baffle plate are provided on each of the plurality of positioners respectively; and the first groove and the second groove are further configured to align an outer edge of the first baffle plate with an outer edge of the first side portion to be flush with each other, and to align an outer edge of the second baffle plate with an outer edge of the second side portion to be flush with each other, in response to the first groove accommodating the first baffle plate and the second groove accommodating the second baffle plate respectively.

According to an embodiment of the disclosure, a first groove configured to accommodate the first baffle plate and a second groove configured to accommodate the second baffle plate are provided on each of the plurality of positioners respectively, the first groove extending from the outer side of the first side portion to a top side of the first side portion, and/or the second groove extending from the outer side of the second side portion to a top side of the second side portion; and the first groove and the second groove are further configured to align an outer edge of the first baffle plate with an outer edge of the first side portion to be flush with each other, to align a top edge of the first baffle plate with a top edge of the first side portion to be flush with each other, respectively, and/or to align an outer edge of the second baffle plate with an outer edge of the second side portion to be flush with each other, to align a top edge of the second baffle plate with a top edge of the second side portion to be flush with each other, respectively, in response to the first groove accommodating the first baffle plate which has the first shielding portion and/or the second groove accommodating the second baffle plate which has the second shielding portion respectively.

According to another aspect of the exemplary embodiment of the present disclosure, there is provided a backlight module, comprising: a backlight source; and the panel positioning assembly as above.

According to an embodiment of the disclosure, the backlight module further comprises a back plate, on which the side frame of the panel positioning assembly is fixed.

According to another aspect of the exemplary embodiment of the present disclosure, there is provided a display device, comprising: the backlight module as above; and the panel, on a back side of which the backlight source of the backlight module is provided.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION OF PREFERRED EMBODIMENTS OF THE DISCLOSURE

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of a panel positioning assembly, a backlight module and a display device.

In order to ensure that technical solutions of the embodiments of the disclosure may be understood readily and better by those skilled in the art, a naked-eye three-dimensional display method, a naked-eye three-dimensional display device, and a terminal equipment according to embodiments of the disclosure may be described in detail hereinafter by referring to the drawings.

According to a general inventive concept of the embodiments of the disclosure, as illustrated in FIG. 1(a) to FIG. 3, a panel positioning assembly, which is used for a panel 2, is provided in an embodiment of the disclosure, comprising: a side frame 1 at least partially provided at a periphery of the panel 2; and a plurality of positioners 3 (such as positioning blocks, and the like) detachably provided on the side frame 1 and configured to position the panel 2.

By providing the plurality of positioners 3 which are detachable, a same backlight module may match with (e.g, be in positive fit with) different positioners 3 which are adapted to differently sized panels 2, and be assembled together; as such, when an original panel 2 is replaced by a different panel 2 having a different size, it is only required to exchange positioners 3 so as to change specific size of a hearing region of the side frame 1 for bearing the panel 2, without replacing the backlight module, thus saving the cost.

There may be various specific structural forms of the positioners 3, as long as the positioners 3 may implement an appropriate positioning of a panel 2 of corresponding size on the side frame 2. In the embodiment of the disclosure, as illustrated in FIG. 1(a), the side frame is provided with four sides, with a corresponding one of the plurality of positioners being provided on each of the four sides.

And specific amounts and specific structural forms of the positioners 3 on each side may also be provided depending on practical requirements.

Figure 1A:
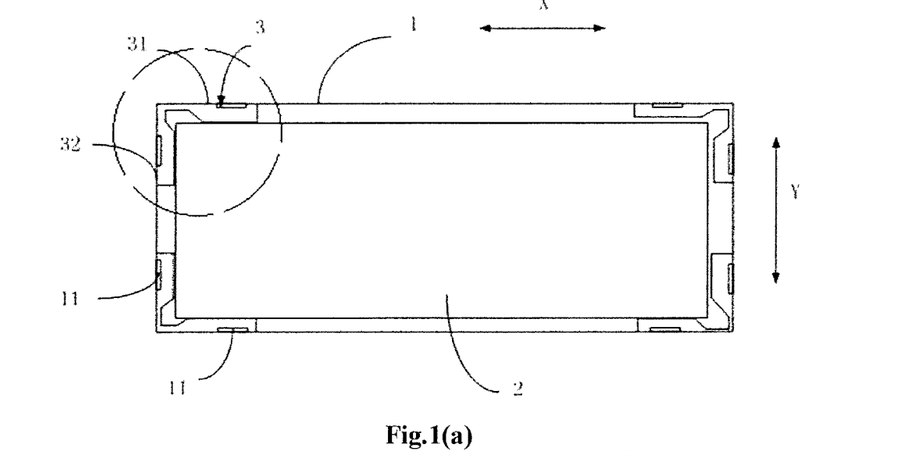
FIG. 1(a) illustrate a structural schematic view of a panel positioning assembly according to an embodiment of the disclosure.

In an embodiment, by way of example, as illustrated in FIG. 1(a), the plurality of positioners 3 are provided respectively at corners of the side frame 1 which corners function as junctions of adjacent sides of the side frame 1 abutting against each other, respectively.

In an embodiment, each of the plurality of positioners 3 is in a form of L shape, and is provided at a junction of two adjacent sides of the side frame corresponding to them.

As illustrated, at least one positioner of the plurality of positioners 3 comprises a first connection block 31 and a second connection block 32. Each of the first connection block and the second connection block extends respective widths in directions as indicated by corresponding arrows, specifically as illustrated in FIG. 1(a), a width of the first connection block 31 refers to a measure of a dimensional scope thereof in which the first connection block 31 extends in a 'Y' direction as illustrated, and a width of the second connection block 32 refers to a measure of a dimensional scope thereof in which the second connection block 32 extends in a 'X' direction as illustrated. In an exemplary embodiment, each of the first connection block and the second connection block is configured to be defined/restricted within (i.e., failing to go beyond) respective width range defined collectively by both an inner wall and an outer wall of a respective side of the side frame 1 on which it is located; for example, each of the first connection block and the second connection block is arranged to be aligned with the respective side of the side frame 1 on which it is located; and more specifically, by way of example, an orthographic projection of each of the first connection block and the second connection block on the panel falls within an orthographic projection of the respective side of the side frame 1 on which it is located, on the panel. By changing a width of at least one of the first connection block and the second connection block provided on at least one of the plurality of positioners 3 in a form of L shape, the size of the bearing region of the side frame 1 for bearing the panel 2 is then changed, so as to facilitating inserting/embedding and bearing differently sized panels 2 into the side frame 1.

A Specific size of the first connection block 31 may for example be set to be the same as or different from a specific size of the second connection block 32, such that they are adapted to positioning of differently sized panels 2.

The first connection block 31 and the second connection block 32 may for example be formed integrally into one piece, for example be formed integrally into one piece in a form of L shape as illustrated, or may for example be provided separately and connected with each other. In an embodiment, by way of example, the first connection block 31 and the second connection block 32 are provided separately and are connected with each other at a junction therebetween so as to be assembled collectively in a form of L shape. As such, when it is required to exchange the positioner(s) 3 assembled on the side frame 1 so as to restrict and bear differently sized panel 2, e.g., by a free collocation between the first connection block 31 and the second connection block 32 so as to implement positioning of panels 2 of different specific sizes respectively, thus decreasing amounts of the positioners 3 which are manufactured depending on requirements of adapting to differently sized panels, and in turn saving costs.

Figure 2:
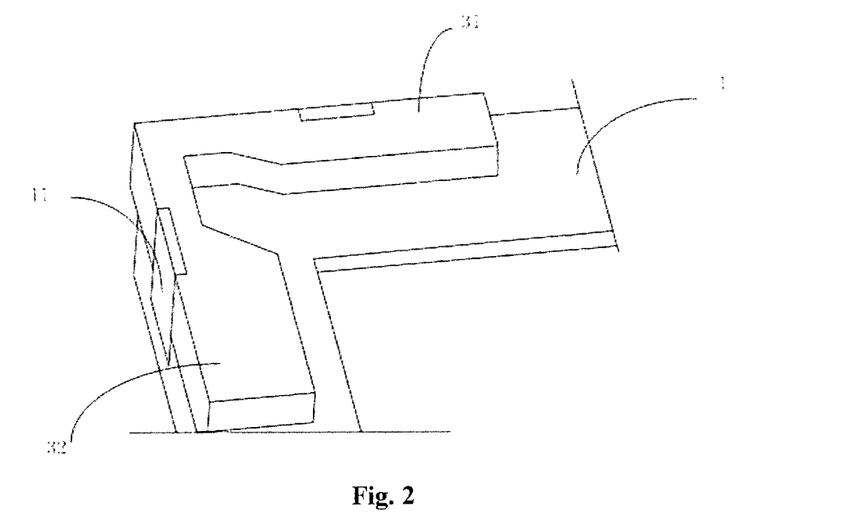
FIG. 2 illustrates a partial structural schematic view of the panel positioning assembly according to the embodiment of the disclosure.

In an embodiment of the disclosure, e.g., as illustrated in FIG. 2, clamping components 11 for connecting with the plurality of positioners 3 respectively are provided at the corners of the side frame 1 which corners function as junctions of adjacent sides of the side frame 1 abutting against each other, respectively, so as to position the plurality of positioners.

Figure 3:
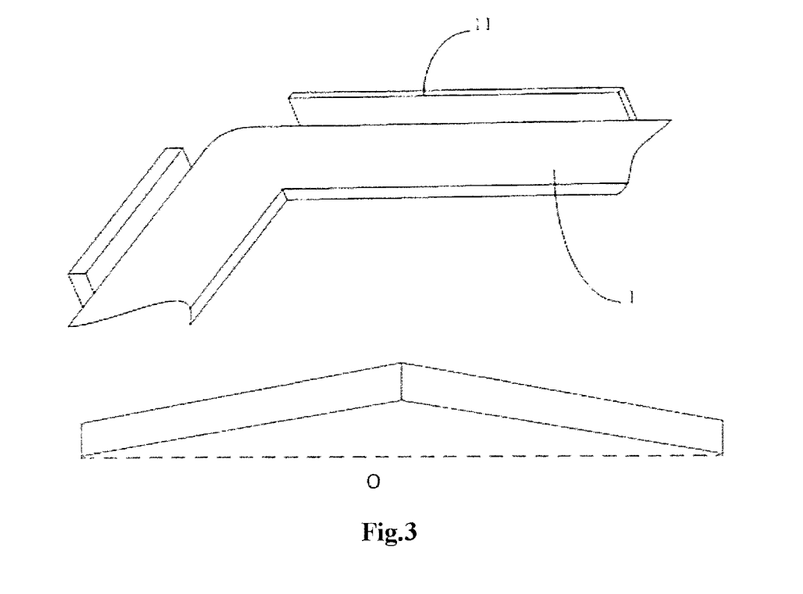
FIG. 3 illustrates a partial structural schematic view of the panel positioning assembly according to an embodiment of the disclosure, without any positioner being provided on a side frame thereof.

There may be various specific structural forms of clamping components 11, as long as they facilitate positioning of the positioners 3, respectively. In an embodiment, e.g., as illustrated in FIG. 1(a) and more specifically as illustrated in FIG. 3, at least one corner of the corners of the side frame 1 comprises a first side portion and a second side portion abutting against each other, with a first baffle plate being provided at an outer side of the first side portion, and a second baffle plate being provided at an outer side of the second side portion, the first baffle plate and the second baffle plate functioning as the clamping components 11 respectively. More specifically, e.g., as illustrated in FIG. 3, the first baffle plate extends perpendicular to the first side portion, at the outer side of the first side portion; and/or the second baffle plate extends perpendicular to the second side portion, at the outer side of the second side portion. In an alternative embodiment, the first baffle plate extends at an angle with respect to the first side portion, at the outer side of the first side portion; and/or the second baffle plate extends at an angle with respect to the second side portion, at the outer side of the second side portion. The first baffle plate and the second baffle plate function as the clamping components 11, respectively, preventing any movement of the positioner(s) 3 in both the X direction and the Y direction, facilitating an effective positioning of the panel 2.

Figure 1B:
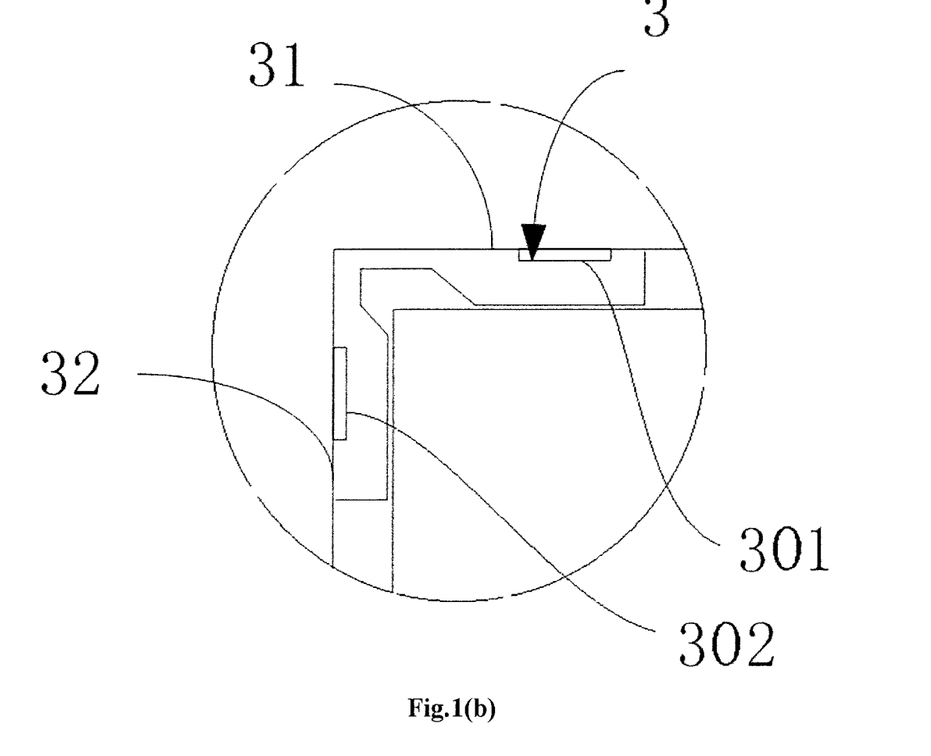
FIG. 1(b) illustrates a partially enlarged schematic view of a portion of the panel positioning assembly as illustrated within a rounded box in FIG. 1(a)

In an embodiment of the disclosure, e.g., as illustrated in FIG. 1(a), FIG. 1(b) and FIG. 2, a top portion of the first baffle plate extends away from the first side portion in a direction perpendicular to the first side portion and bends inwards the side frame 1 to form a first shielding portion 301, and a top portion of the second baffle plate extends away from the second side portion in a direction perpendicular to the second side portion and bends inwards the side frame 1 to form a second shielding portion 302. The first shielding portion 301 is provided on the first baffle plate and/or the second shielding portion 302 is provided on the second baffle plate, preventing any movement of the positioner(s) 3 in a direction perpendicular to the panel 2, facilitating an effective positioning of the panel 2.

It should be noticed that, in the clamping components 11 as illustrated in FIG. 3, a tip of the top portion of the first baffle plate is not bent, i.e., no first shielding portion is provided; and a tip of the top portion of the second baffle plate is not bent, i.e., no second shielding portion is provided.

Figure 4:
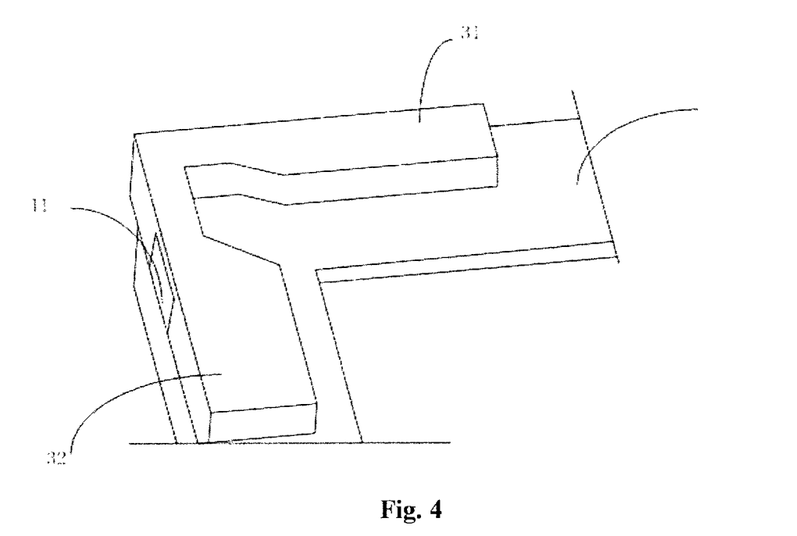
FIG. 4 illustrates a partial structural schematic view of the panel positioning assembly according to another embodiment of the disclosure, with positioners being provided on a side frame thereof.
Figure 5:
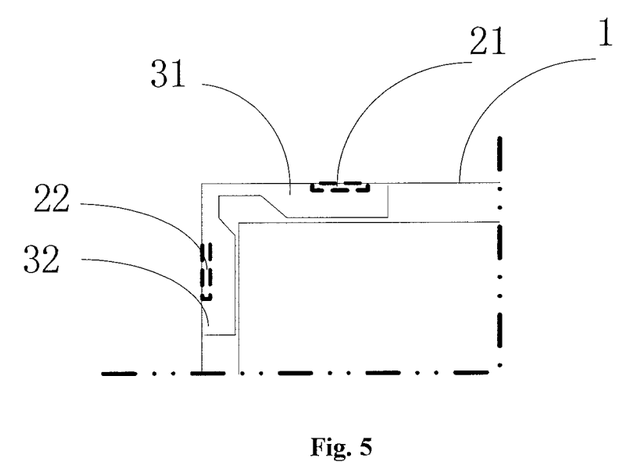
FIG. 5 illustrates a top view of exemplary positioners of the panel positioning assembly according to the another embodiment of the disclosure.

In another embodiment of the disclosure, as illustrated in FIG. 4 and FIG. 5, a first groove 21 configured to accommodate the first baffle plate and a second groove 22 configured to accommodate the second baffle plate are provided on each of the plurality of positioners respectively; and the first groove and the second groove are further configured to align an outer edge of the first baffle plate with an outer edge of the first side portion to be flush with each other, and to align an outer edge of the second baffle plate with an outer edge of the second side portion to be flush with each other, in a condition that the first groove accommodates the first baffle plate and the second groove accommodates the second baffle plate respectively. Specifically, the first groove 21 is recessed into the first connection block 31 and the second groove 22 is recessed into the second connection block 32, and in a condition that a corresponding positioner 3 is to be positioned, the first baffle plate is completely inserted into the first groove 21 and the second baffle plate is completely inserted into the second groove 22. By such a setting, the first baffle plate and the second baffle plate may not project out of a corresponding first groove 21 and a corresponding second groove 22, respectively, resulting in smooth and aesthetic appearances of both an assembly of the first baffle plate and the first groove, and another assembly of the second baffle plate and the second groove when the panel positioning assembly bears the panel, without any uncomfortable tactility of a user touching the panel positioning assembly by hand.

A schematic view of a condition in which a positioner 3 is connected onto the side frame 1 in a plug-in manner is as illustrated in FIG. 4. And as shown in FIG. 5, the first groove 21 and the second groove 22 are illustrated by dotted lines.

Figure 6:
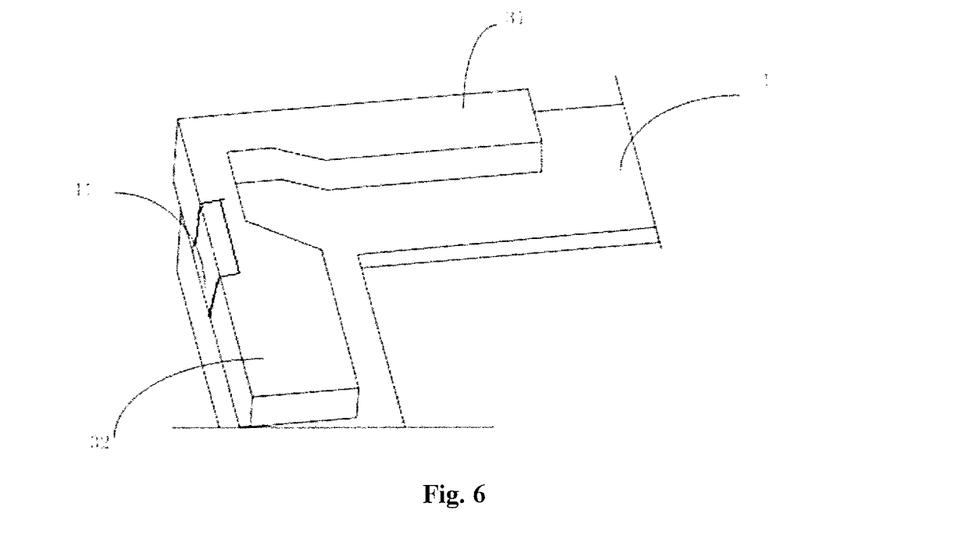
FIG. 6 illustrates a partial structural schematic view of the panel positioning assembly according to still another embodiment of the disclosure, with positioners being provided on a side frame thereof.
Figure 7:
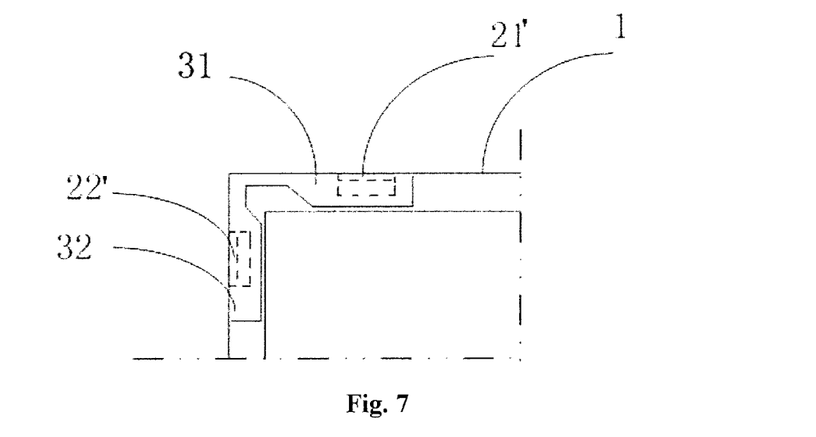
FIG. 7 illustrates a top view of exemplary positioners of the panel positioning assembly according to the still another embodiment of the disclosure.

In a further embodiment of the disclosure, provided that the first shielding portion 301 is provided on the first baffle plate and/or the second shielding portion 302 is provided on the second baffle plate, as further illustrated in FIG. 6 and FIG. 7, a first groove 21' configured to accommodate the first baffle plate and a second groove 22' configured to accommodate the second baffle plate are provided on each of the plurality of positioners respectively. By way of example, the first groove 21' extends from the outer side of the first side portion to a top side of the first side portion, and/or the second groove 22' extends from the outer side of the second side portion to a top side of the second side portion. And in a condition that the first groove accommodates the first baffle plate which has the first shielding portion and/or the second groove accommodates the second baffle plate which has the second shielding portion respectively, the first groove and the second groove are further configured such that an outer edge of the first baffle plate is aligned with an outer edge of the first side portion to be flush with each other, a top edge of the first baffle plate is aligned with a top edge of the first side portion to be flush with each other, respectively, and/or an outer edge of the second baffle plate is aligned with an outer edge of the second side portion to be flush with each other, a top edge of the second baffle plate is aligned with a top edge of the second side portion, respectively. As such, the first baffle plate which has the first shielding portion is completely inserted into the first groove 21' and the second baffle plate which has the second shielding portion is completely inserted into the second groove 22'. By such a setting, the first baffle plate which has the first shielding portion and the second baffle plate which has the second shielding portion may not project out of a corresponding first groove 21 and a corresponding second groove 22, respectively, resulting in smooth and aesthetic appearances of both an assembly of the first baffle plate and the first groove, and another assembly of the second baffle plate and the second groove when the panel positioning assembly bears the panel, without any uncomfortable tactility of a user touching the panel positioning assembly by hand.

In an embodiment of the disclosure, At least one positioner 3 of the plurality of positioners comprises the first connection block 31 and the second connection block 32, and a notch which is recessed inwards the side frame 1 is formed at a junction of the first connection block 31 and the second connection block 32 of the at least one positioner 3 of the plurality of positioners, on inside walls of the at least one positioner which interface with each other and both face towards an inner side of the side frame 1.

By providing the notch, it prevents any interference and collision between the panel 2 (especially its sharp corners which are vulnerable and fragile) and corresponding positioners 3, and in turn prevents any injury to the panel 2. Furthermore, the notch also functions as a guide for the panel during a process in which the panel is assembled into the side frame, allowing a slight displacement of the sharp corners of the panel 2 within the notch so as to adjust an entire periphery of the panel to be positioned and accommodated completely in place within the side frame.

In an embodiment of the disclosure, the positioner(s) 3 may be provided at a corner of the side frame 1.

By way of example, the plurality of positioners 3 may be provided at the four corners of the side frame 1, so as to position the panel 2 effectively.

As illustrated in FIG. 1, a dimensional scope (i.e., length) of the first connection block 31 of one of the plurality of positioners 3 extending in the X direction may for example set to be the same as or different from a dimensional scope (i.e., length) of the second connection block 32 of one of the plurality of positioners 3 extending in the Y direction. Similarly, a dimensional scope (i.e., width) of the first connection block 31 of one of the plurality of positioners 3 extending in the Y direction may for example set to be the same as or different from a dimensional scope (i.e., width) of the second connection block 32 of one of the plurality of positioners 3 extending in the X direction. Specific shape of the plurality of positioners 3 at the four corners of the side frame 1 may for example be exactly the same, or be different from one another respectively, as long as they may implement an appropriate positioning of a corresponding panel.

By providing the panel positioning assembly according to the embodiments of the disclosure, it is only required to exchange positioners in the display products of a same nominal dimension, without replacing the backlight module, such that panels having different active areas and different specific panel sizes may be supported and fixed by newly exchanged positioners, thus saving the cost.

In another aspect of the embodiments of the disclosure, a backlight module is further provided, comprising: a backlight source; and the panel positioning assembly as above. The backlight module further comprises a back plate, on which the side frame 1 of the panel positioning assembly for bearing the panel 2 is fixed. The side frame 1 is for example formed by a rubber material, or for example formed by a metallic material.

In still another aspect of the embodiments of the disclosure, a display device is also provided, comprising: the backlight module as above; and the panel, on a back side of which the backlight source of the backlight module is provided.

Although embodiments of the disclosure are already illustrated and depicted as above, it should be appreciated for those skilled in this art that the above embodiments are only exemplary embodiments intended to illustrate the operation principle of the disclosure, rather than being limited thereto. As to those skilled in the art, various variations and/or modifications may be made in these embodiments, without departing from the principles and spirit of the disclosure, and these variations and/or modifications still lie within the scope of present application.

What is claimed is:

1. A panel positioning assembly which is used for a panel, comprising:
   a side frame at least partially provided at a periphery of the panel; and
   positioners detachably provided on the side frame and configured to position the panel;
   wherein the positioners are provided respectively at corners of the side frame which function as junctions of adjacent sides of the side frame abutting against each other, respectively;

wherein each of the positioners is in a form of L shape, and is provided at a junction of two adjacent sides of the side frame corresponding thereto;

wherein clamping components for connecting with the positioners respectively are provided at the corners of the side frame, respectively;

wherein at least one corner of the side frame comprises a first side portion and a second side portion abutting against each other, with a first baffle plate being provided at an outer side of the first side portion, and a second baffle plate being provided at an outer side of the second side portion, the first baffle plate and the second baffle plate functioning as the clamping components respectively; and wherein at least one of the first baffle plate and the second baffle plate extends perpendicular to a respective one of the first side portion and the second portion, at the outer side of the latter.

2. The panel positioning assembly according to claim 1, wherein the side frame is provided with four sides, on each of which a corresponding one of the positioners is provided.

3. The panel positioning assembly according to claim 1, wherein at least one positioner of the positioners comprises a first connection block and a second connection block.

4. The panel positioning assembly according to claim 3, wherein the first connection block and the second connection block differs from each other in size.

5. The panel positioning assembly according to claim 3, wherein the first connection block and the second connection block are provided separately and connected with each other.

6. The panel positioning assembly according to claim 5, wherein a notch which is recessed inwards the side frame is formed at a junction of the first connection block and the second connection block of the at least one positioner of the positioners, on inside walls of the at least one positioner which interface with each other and both face towards an inner side of the side frame.

7. The panel positioning assembly according to claim 3, wherein the first connection block and the second connection block are formed integrally into one piece.

8. The panel positioning assembly according to claim 1, wherein a top portion of the first baffle plate extends away from the first side portion in a direction perpendicular to the first side portion and bends inwards the side frame to form a first shielding portion, and a top portion of the second baffle plate extends away from the second side portion in a direction perpendicular to the second side portion and bends inwards the side frame to form a second shielding portion.

9. The panel positioning assembly according to claim 8, wherein a first groove configured to accommodate the first baffle plate and a second groove configured to accommodate the second baffle plate are provided on each of the positioners respectively, the first groove extending from the outer side of the first side portion to a top side of the first side portion, and/or the second groove extending from the outer side of the second side portion to a top side of the second side portion; and the first groove and the second groove are further configured to align an outer edge of the first baffle plate with an outer edge of the first side portion to be flush with each other, to align a top edge of the first baffle plate with a top edge of the first side portion to be flush with each other, respectively, and/or to align an outer edge of the second baffle plate with an outer edge of the second side portion to be flush with each other, to align a top edge of the second baffle plate with a top edge of the second side portion to be flush with each other, respectively, in response to the first groove accommodating the first baffle plate which has the first shielding portion and/or the second groove accommodating the second baffle plate which has the second shielding portion respectively.

10. The panel positioning assembly according to claim 1, wherein a first groove configured to accommodate the first baffle plate and a second groove configured to accommodate the second baffle plate are provided on each of the positioners respectively; and the first groove and the second groove are further configured to align an outer edge of the first baffle plate with an outer edge of the first side portion to be flush with each other, and to align an outer edge of the second baffle plate with an outer edge of the second side portion to be flush with each other, in response to the first groove accommodating the first baffle plate and the second groove accommodating the second baffle plate respectively.

11. A backlight module, comprising:
a backlight source; and
the panel positioning assembly according to claim 1.

12. The backlight module according to claim 11, wherein the backlight module further comprises a back plate, on which the side frame of the panel positioning assembly is fixed.

13. A display device, comprising:
the backlight module according to claim 12; and
the panel, on a back side of which the backlight source of the backlight module is provided.

* * * * *